United States Patent [19]
Miyabayashi et al.

[11] Patent Number: 4,880,891
[45] Date of Patent: * Nov. 14, 1989

[54] ONE-CAN THERMOSETTING RESIN COMPOSITIONS AND PRECOATED METAL

[75] Inventors: Shigeaki Miyabayashi, Kobe; Yoshikatsu Matsuura, Minoo; Hiroshi Kanai, Kimitsu; Joji Oka, Tokyo, all of Japan

[73] Assignees: Takeda Chemical Industries, Ltd., Osaka; Nippon Steel Corporation, Tokyo, both of Japan

[*] Notice: The portion of the term of this patent subsequent to Feb. 16, 2005 has been disclaimed.

[21] Appl. No.: 200,378

[22] Filed: May 31, 1988

[30] Foreign Application Priority Data

May 29, 1987 [JP] Japan .................................. 62-137156

[51] Int. Cl.$^4$ .............................................. C08G 18/80
[52] U.S. Cl. .................... 528/45; 428/425.8; 427/388.1; 427/388.2
[58] Field of Search ............ 528/45; 427/388.1, 388.2; 428/425.8

[56] References Cited

U.S. PATENT DOCUMENTS

| 4,389,457 | 6/1983 | Panze et al. | 528/45 |
| 4,395,529 | 7/1983 | Panandiker et al. | 528/45 |
| 4,550,154 | 10/1985 | Kordomenes | 528/45 |
| 4,562,714 | 1/1986 | Tanaka et al. | 528/45 |
| 4,649,067 | 3/1987 | Gras | 528/45 |
| 4,725,661 | 2/1988 | Miyabayashi | 528/45 |

Primary Examiner—John Kight
Assistant Examiner—Dennis R. Daley
Attorney, Agent, or Firm—Wenderoth, Lind & Ponack

[57] ABSTRACT

A one-can thermosetting resin composition comprising (1) a polyester polyol obtained by allowing an aliphatic dicarboxylic acid to react with an aliphatic glycol and polyol having at least three functional groups and (2) a blocked product of $\alpha,\alpha,\alpha'\alpha'$-tetramethyl-xylylene diisocyanate or 4,4'-methylene bis (cyclohexyl isocyanate), or a blocked product of an NCO-terminated prepolymer obtained by allowing $\alpha,\alpha,\alpha'\alpha'$-tetramethylxylylene diisocyanate and/or 4,4'-methylene bis(cyclohexylisocyanate) to react with an active hydrogen compound, gives tough coating films in yellowing and thermal degradation, and also exhibits increased hardness as well as high flexibility, stain resistance and chemical resistance. Especially, when the resin composition is used for preparing precoated metals, it gives good steel plates, thus being advantageously utilized for, among others, light electric appliances.

10 Claims, No Drawings

ONE-CAN THERMOSETTING RESIN COMPOSITIONS AND PRECOATED METAL

The present invention relates to one-can thermosetting resin compositions which are excellent in film performance and are especially good subsequent fabrication requiring high flexural strength, particularly it relates to resin compositions useful as a coating of steel plate e.g. precoated metal.

In general, precoated metal is optionally shaped for ultimate use, after applying a coating to a metal plate such as glavanized steel, which is used for, for example, metal framing materials including light electric appliances such as refrigerators, washing machines, electric stoves, etc. as well as vending machines, business machines, food display cases, etc. Such precoated metal as above, as compared with the post-coating process in which, after a metal plate is shaped into a complicatedly shaped article, a coating is applied thereon, has such advantages as rationalization of the coating process, uniform quality, saving of the volume of a coating material consumed, etc., and, therefore, enlargement of the field of use of such precoated metal is expected.

The coating to be applied onto precoated metal plate is required, because procoated metal plate is processed into shapes corresponding to such uses as enumerated above after formation of coating film, to keep extensibility as well as adhesion onto the metal surface enough to be resistant to fabrication such as bending, rolling, embossing pressure, drawing, etc. On the other hand, for articles thus shaped are required adequate properties corresponding to the respective ultimate uses, for example, in the case of exterior building panel, a high weatherability and a strong corrosion-resistance covering also the fabricated parts, and, in the case of household electrical appliances such as refrigerators, scarring-resistance and staining resistance. Besides these properties, depending on uses, service durability such as gloss, water resistance, chemical resistance, moisture resistance, etc. is further required.

For such household electrical appliances mentioned above, have been used aminoalkyd resins, melamine-curing acrylic polyols or epoxy resins. These resins are poor in flexibility of the film, and they give rise to cracking on the coating films when bended at an angle of 90° or more.

While a method of preparing pre-coated metal by coating a metal plate with a composition comprising a blocked product of bis(isocyanatomethyl)cyclohexane or its adduct and polyol resin and heating thus coated metal plate to cause the coated material to cure has also been known (Toku-Kai Sho 56-89548), precoated metal thus obtained dose not necessarily satisfy all of such properties as mentioned above.

Further, another method of preparing precoated metal plate with a composition comprising an isocyanate compound blocked with ethyleneimine and polyol resin and heating thus coated metal plate to cause the coated material to cure has also been known (Toku-Kai Sho 57-10375), but precoated metal thus obtained does not satisfy all of such properties as described above.

It has been a remarkably difficult problem to improve the performance of coating films while keeping good balance of processability on bending, staining resistance and hardness. The object of the present invention is to provide a resin composition yielding excellent coating films having good balance of processability on bending, staining resistance and hardness and also excellent in other film properties. The present inventors diligently carried out extensive research work for preparing resin compositions showing excellent film performance and, as a result, found out that, by using aliphatic dicarboxylic acid and aliphatic glycol in the preparation of polyester polyol and by combination of this polyester polyol with a blocked product of a specific polyisocyanate, coating films having good processability on bending, superior hardness and also excellent chemical resistance as well as staining resistance can be provided. Based on these findings, the present invention was accomplished.

More specificatlly, the present invention relates to 1. a one-can thermosetting resin composition comprising (1) a polyester polyol obtained by allowing an aliphatic dicarboxylic acid to react with an aliphatic glycol and a polyol having at least three functional groups and (2) a blocked product of $\alpha,\alpha,\alpha',\alpha'$-tetramethyl-xylylene diisocyanate of 4,4'-methylene bis(cyclohexyl isocyanate), or a blocked product of an NCO-terminated prepolymer obtained by allowing $\alpha,\alpha,\alpha',\alpha'$-tetramethyl-xylylene diisocyanate and /or 4,4'-methylene bis(cyclohexyl isocyanate) to react with an active hydrogen compound, and 2. precoated metal, which is prepared by coating a metal plate with a one-can thermosetting resin composition comprising (1) a polyester polyol obtained by allowing an aliphatic dicarboxylic acid to react with an aliphatic glycol and a polyol having at least three functional groups and (2) a blocked product $\alpha,\alpha,\alpha',\alpha'$-tetrametyl-xylylene diisocyanate or 4,4'-methylene bis(cyclohexyl isocyanate), or a blocked product of an NCO-terminated prepolymer obtained by allowing $\alpha,\alpha,\alpha',\alpha'$-tetramethyl-xylylene diisocyanate and/or 4,4'-methylene bis(cyclohexyl isocyanate) to react with an active hydrogen compound, and heating thus coated metal plate to cause the coated material to cure.

The polyester polyol(1) used for the present invention is that obtained by allowing aliphatic dicarboxylic acid to react with aliphatic glycol and polyol at least three functional groups.

Examples of the aliphatic dicarboxylic acid used for the preparation of the above-mentioned polyester polyol include succinic acid, succinic anhydride, adipic acid, azelaic acid, sebacic acid, dodecanoic acid, maleic acid, maleic anhydride, fumaric acid, itaconic acid, dimer acid, etc.

Examples of the aliphatic glycol include ethylene glycol, diethylene glycol, propylene glycol, 1,3 butylene glycol, 1,4 butylene glycol, dipropylene glycol, 1,5 pentanediol, neopentyl glycol ester of hydroxy pivalic acid, triethylene glycol, 1,9-nonanediol, 3-methyl-1,5 pentanediol, 2,2,4 trimethyl-1,3 pentanediol, 2-ethyl-1,3 hexanediol, polycaprolactone diol, polypropylene glycol, polytetramethylene ether glycol, polycarbonate diol, 2-n-butyl 2-ethyl 1,3 propane diol, 2,2 diethyl 1,3 propane diol, 2-ethyl 1,3 hexanediol, etc.

Examples of the polyol having at least three OH groups include glycerin, trimethylol propane, trimethylol ethane, 1,2,6-hexanetriol, pentaerythritol, diglycerin as well as, using these polyols as initiators, ethylene oxide adduct, propylene adduct or $\epsilon$-caprolactone adduct, etc.

The polyester polyol(1) to be employed in the present invention can be obtained by subjecting the afore-mentioned dicarboxylic acid, glycol and polyol having at least three OH groups to esterification.

Concrete examples of the esterification include a method which comprises subjecting dicarboxylic acid, glycol and polyol having at least three OH groups to reaction simultaneously; a method which comprises first allowing dicarboxylic acid to react with glycol until the acid value of the reaction mixture reaches a given value, then allowing polyol to react therewith; and, when the dicarboxylic acid is acid anhydride, a method which comprises first allowing dicarboxylic acid to react with an excess amount of glycol until the acid value of the reaction mixture reaches a given value, then confirming that the acid value reached the given value, followed by allowing polyol to react therewith.

And, when the dimethyl ester of dicarboxylic acid is employed, it is used in an amount of more than the mole number of glycol, and the condensate is distilled off to obtain a polyester having methyl ester groups at its both terminals, then polyol is added to the reaction system to cause esterexchange to thereby obtain a polyester polyol.

In the case of using an acid anhydride, dicarboxylic acid is first used in an amount of less than the mole number of glycol, and the condensate is distilled off to obtain a polyesterified compound having OH groups at its both terminals, then dicarboxylic acid anhdyride is added to the reaction system to cause ring-opening to thereby obtain a polyesterified compound haivng -COOH groups at its both terminals.

Then, polyol is added to the reaction system, and esterification is allowed to proceed to obtain a polyester polyol.

The polyester polyol employable in the present invention has, preferably, 3 to 7 groups, whose number-average molecular weight is 600 to 3500 and the hydroxyl value ranges from 40 to 460. Use of a polyester polyol having not more than three functional groups gives, in some cases, lower hardness of cured film and insufficient chemical-resistance.

Use of a polyester polyol having more than seven functional groups gives, in some cases, poor folding endurance. Use of a polyester polyol having a number-average molecualr weight of not more than 600 gives poor gloss of cured film. Use of a polyester polyol having a number-average molecualr weight of not less than 3500, the viscosity of the product becomes higher, causing a problem on coating workability, and, in some case, the stain-resistance of the film becomes poor. The hydroxyl value ranges from 40 to 460, especially preferably 100 to 450. Use of a polyester polyol whose hydroxyl value is less than 40 gives, in some cases, poor chemical resistance and stain-resistance. And, use of a polyester polyol whose hydroxyl value exceeds 460 causes, in some cases, poor folding resistance of the coated film.

The blocked product (2) to be employed in the present invention is exemplified by that of $\alpha,\alpha,\alpha',\alpha'$-tetramethylxylylene diisocyanate(hereinafter referred to as TMXDI) or 4,4'-methylenebis(cyclohexylisocyanate)(hereinafter referred to as $H_{12}MDI$) or that of a prepolymer having an NCO group at terminal obtained by the reaction of either one of them with an active hydrogen compound. Examples of TMXDI include m-TMXDI, p-TMXDI and a mixture thereof.

The prepolymers having terminal NCO groups obtained by the reaction of these diisocyanates with the active hydrogen compound can be produced by allowing the above-mentioned isocyanate monomer to react with the active hydrogen compound in the state of excess amount of the isocyanate groups.

The active hydrogen compound employable for preparing this prepolymer is exemplified by a low-molecular-weight polyol, e.g. a divalent alcohol such as ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxy pivalic acid, triethylene glycol, hydrogenated bisphenol A, xylylene glycol, 1,4-butylene glycol, etc., a trivalent alcohol such as glycerin, trimethylol ethane, trimethylol propane, 2,2,6-hexanetriol, etc., a tetravalent alcohol such as pentaerythritol, etc.; polyether polyol such as propylene oxide or ethylene oxide adducts of the above-mentioned polyol; and a high-molecular-weight polyol such as polyester polyol obtainable by allowing the above-mentioned low-molecular-weight polyol to react with dicarboxylic acid or that modified with fatty acid the course of preparing the polyester polyol.

These polyols may be used alone or as a mixture.

The prepolymer can be prepared by conducting the reaction with the equivalent ratio of NCO/OH within the range of about 2.0 to 15, preferably about 4 to 8, usually at 40 to 140° C., preferably at 70° to 100° C., followed by, upon necessity, removing unreacted isocyanate monomer by means of conventional thin-film distillation or extraction. This reaction can be carried out in the presence of an organometallic catalyst such as tin-, lear-, zinc- or iron-type one. The prepolymer is exemplified by biuret compounds obtainable by allowing an excess of the above-mentioned isocyanate monomer to react with water or a low molecular amine such as ethylenediamine; allophanate compounds obtainable by allowing an excess isocyanate monomer to react with the above-mentioned low-molecular-weight polyol or high-molecular-weight polyol; and further by dimers or trimers obtainable by subjecting an isocyanate monomer to reaction by using a known catalyst for dimerization or trimerization of an organic diisocyanate.

The afore-mentioned blocked isocyanate monomers or blocked prepolymers thereof can be obtained by allowing an isocyanate monomer or a prepolymer thereof to react with a blocking agent by a conventional process. As the blocking agent, use may be made of any of the blocking agents known to be employable for the blocking of isocyanates, such as those based on phenol, lactam, active methylene, alcohol, mercaptan, acid amide, imide, amine, imidazole, urea, carbamic acid salt, imine, oxime or sulfite. Among them, the blocking agents based on phenol, oxime, lactam and imine are employed especially advantageously. As specific examples of the blocking agent, the following are set forth.

Blocking agents based on phenol

Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hydroxybenzoic acid ester, etc.

Blocking agents based on lactam $\epsilon$-caprolactam, $\delta$-valerolactam, $\gamma$-butyrolactam, $\beta$-propiolactam, etc.

Blocking agents based on active methylene

Diethyl malonate, dimethyl malonate, ethyl acetoacetate, methyl acetoacetate, acetylacetone, etc.:

Blocking agents based on alcohol

Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxymethanol, glycolic acid, glycolic acid esters such as methyl glycolate, ethyl glycolate, butyl glycolate, etc., lactic acid, lactic acid esters such as methyl lactate, ethyl lactate, butyl lactate, etc., methylolurea, methylolmelamine, diacetone alcohol, ethylene chlorohydrin, ethylene bromohydrin, 1,3-dichloro-2-propanol, $\omega$-hydroperfluoroalcohol, acetone cyanohydrin, etc.

Blocking agents based on mercaptan

Butyl mercaptan, hexyl mercaptan, t-butyl mercaptan, t-dodecyl mercaptan, 2-mercaptobenzothiazole, thiophenol, methylthiophenol, ethyl thiophenol, etc.

Blocking agents based on acid amide

Acetoanilide, acetanisidide, acetotoluide, acrylamide, methacrylamide, acetamide, stearic acid amide, benzamide, etc.

Blocking agents based on imide

Succinimide, phthalimide, maleimide, etc.

Blocking agents based on amine

Diphenylamine, phenylnaphthylamine, xylidine, N-phenylxylidine, carbazole, aniline, naphthylamine, butylamine, dibutylamine, butylphenylamine, etc.

Blocking agents based on imidazole

Imidazole, 2-ethylimidazole, etc.

Blocking agents based on urea

Urea, thiourea, ethyleneurea, ethylenethiourea, 1,3-diphenylurea, etc.

Blocking agents based on carbamate

Phenyl N-phenylcarbamate, 2-oxazolidone, etc.

Blocking agents based on imine

Ethyleneimine, propyleneimine, etc.

Blocking agents based on oxime

Formamidoxime, acetaldoxime, acetoxime, methyl ethyl ketoxime, diacetyl monoxime, benzophenone oxime, cyclohexanoneoxime, etc.

Blocking agents based on sulfite

Sodium bisulfite, potassium bisulfite, etc.

Examples of practical procedures of conducting the above-mentioned reaction between an isocyanate monomer or a prepolymer thereof and a blocking agent include a procedure of reacting an isocyanate monomer or its prepolymer with a blocking agent at an NCO/active hydrogen groups in the blocking agent equivalent ratio of about 0.90 to 1.0, preferably about 0.95 to 1.0; a procedure which comprises allowing an isocyanate monomer to react with a blocking agent at an equivalent ratio of NCO/active hydrogen groups in the blocking agent being about 1.1 to 3.0, preferably about 1.2 to 2.0, followed by further reaction with such low-molecular-weight polyol, high-molecular-weight polyol, water or lower amine as usable in the above-mentioned prepolymer production; or a procedure which compsises allowing an isocyanate monomer to react with a low-molucular-weight polyol, a high-molecular-weight polyol, water or a low molecular amine at an NCO/active hydrogen equivalent ratio of about 1.5 to 10.0, preferably about 2.0 to 7.0, followed by further reaction with a blocking agent.

Each of the above-mentioned reactions is carried out by a conventional procedure in the presence or absence of a solvent having no active hydrogen (e.g. aromatic ones such as benzene, toluene, xylene, etc., petroleum solvents such as Solvesso-100, Solvesso-200, etc., esters such as ethyl acetate, butyl acetate, etc., ketones such as acetone, methyl ethyl ketone, methyl isobutyl ketone, cyclohexanone, etc., ethers such as tetrahydrofuran, or the like). In conducting the reaction, a known catalyst such as tertiary amine, an organometallic compound or the like may be employed.

The one-can thermosetting resin composition of the present invention is a one containing the above-mentioned polyester polyol(1) and blocked product(2).

The ratio of the above-mentioned component(1) and component (2) is about 2/1 to ½ in terms of equivalent ratio of OH/regenerated isocyanate groups, especially preferably about 1/0.8 to 1/1.2.

While the composition of the present invention can be used itself as clear coatings or adhesives, it may be supplemented, in addition to the above-mentioned components (1) and (2), depending upon necessity, with for example an organic solvent such as ester e.g. ethyl acetate, butyl acetate, methyl acetoacetate, 2-ethoxyethylacetate, etc., aromatic solvents e.g. xylene, toluene, etc., ketones e.g. methyl ethyl ketone, methyl isobutyl ketone, cyclohexanone, etc., ethers e.g. diethylene glycol dimethyl ether, etc., petroleum solvents e.g. Solvesso100, Solvesso-200, etc.; coloring pigments or extenders, dispersants of such type as silicone-, amine-, polyether-, polyester-, castor oil-, synthetic wax- or bentonite-, etc.; an antifoaming agent; a levelling agent; a thixotropic agent; a stabilizer of such type as benzotriazole-, hindered amine-or hindered phenol-, etc.; a catalyst of such type as tin-, lead-, zinc- or iron-, etc.

The one-can thermosetting resin composition of the present invention obtained thus above is applied onto a substrate, which is then subjected to heating to thereby dissociate the blocking agent contained in (2) to regenerate NCO groups, and these regenerated NCO groups react with OH groups in (1) to give a cured film.

The resin composition of the present invention is used as coatings or adhesives, and especially it is advantageously used for preparing precoated metals.

The metal plate usable for preparation of precoated metals, normally, may be any one employed for pre-coated metal, which is exemplified by cold-rolled steel, galvanized steel, alloyed zinc-plated steel, chromium-plated steel, aluminium-plated steel, lead-plated steel, nickel-plated steel, aluminium plate, titanium plate, stainless steel plate, etc. The resin composition of the present invention is applied to these substrates directly directly or after conventional pre-treatment. In any of these cases, the resin composition of the present invention may be applied to these substrates, upon necessity, after they are precoated with a primer then being optionally dried. The pre-treatment includes chromating process, phosphating process, composite-oxide-film-forming process, etc. The chromating process is exemplified by electrolytic, spreading-reacting-type. The phosphating process is exemplified by zinc-phosphating and iron-phosphating process. The composite-oxide-film-forming process included a one in which the composite oxide contains neckel and cobalt.

As the primer can be used conventional ones of epoxy resin type, high molecular polyester type.

Shape and form of metal plates may be either flat or cylindrical. On these metal plates is applied the resin composition of the present invention. The volume of the resin composition to be applied is not limitative but can be optionally decided, and, preferably, it is in a range of giving a thickness of about 10 to 30$\mu$ of dried film.

As examples of the means of application, there may be mentioned spray-gun, roll coater, flow coater, etc.

Then, the coated metal plates are heated for curing.

The heating temperature (heat metal temperature) varies with the kinds of blocking agents and is about 150° to 350° C., while the heating time is preferably in the range of from about 20 to 120 seconds. Through such heating procedure, the blocking agent in the blocked product(2) dissociates to regenerate NCO groups react with OH groups in (1) to cause crosslinking, yielding tough coating films.

The film obtained by curing the one-can thermosetting resin composition of the present invention is completely freed of yellowing and thermal degradation. The film also exhibits increased hardness as well as high flexibility, stain resistance and chemical resistance. Especially, when the resin composition of the present invention is used for preparing precoated metals, it gives good steel plates, thus being advantageously utilized for, among others, light electric appliances.

The present invention is more specifically illustrated by the following Reference Examples and Working Examples. In the Examples, parts or % means parts by weight or weight %, respectively.

Preparation of Polyester Polyol

REFERENCE EXAMPLE 1

A reaction vessel was charged with 3-methyl-1,5 pentadiol [245.3 parts(2.08 mol.)] and adipic acid[541.6 parts(3.71 mol.)]. The mixture was heated to 220° C., into which was blown nitrogen gas, then the reaction was allowed to proceed while distilling off the condensation water. When the acid value reached 280, trimethylol propane [hereinafter abbreviated as TMP[]372.9 parts(2.78 mol.)] was added to the reaction mixture. The reaction was then allowed to proceed in like manner while distilling off the condensation water to thereby obtain a polyester polyol whose acid value is 1.6 and hydroxyl value is 216.0. This polyol was dissolved in cyclohexanone to give a solution whose solid content was 50%. The composition ratio of the raw materials of this polyol and the properties of this polyol are shown in Table 1.

REFERENCE EXAMPLES 2 to 6

Except for varying the amounts of the starting materials as shown in Table 1, reactions were carried out under conditions similar to those of Reference Example 1 to obtain the corresponding polyester polyols. In the table, numbers of "parts" required for obtaining 1000 parts of a solid portion of polyester polyol are shown.

REFERENCE EXAMPLE 7

A reaction vessel was charged with ethylene glycol[183.4 parts(2.95 mol.)] and succinic acid[664.7 parts(5.63 mol.)]. The reaction was allowed to proceed under the conditions similar to those of Reference Example 1 . When the acid value of the reaction mixture reached 420.0, TMP[189.4 parts(1.41 mol.)] was added to the reaction system. Esterification was allowed to proceed continuously, and, when the acid value reached 170.0, ethylene glycol[183.4 parts(2.95 mol.)] was further added, and the condensation water was distilled off to leave a polyester polyol whose acid value was 1.5 and hydroxyl value was 215.5. This polyol was dissolved in cyclohexanone to give a solution whose solid content was 60%.

REFERENCE EXAMPLE 8

A reaction vessel was charged with ethylene glycol[151.8 parts(2.45 mol.)] and succinic acid[550.0 parts(4.66 mol.)]. The reaction was allowed to proceed under the conditions similar to those of Reference Example 2. When the acid value of the reaction mixture reached 420.0, pentaerythritol[159.3 parts(1.17 mol.)] was further added to the reaction system. Esterification was allowed to proceed continuously, and, when the acid value reached 165.0, pentaerythritol[159.3 parts (1.17 mol.)] and TMP[157.0 parts(1.17 mol.)] were further added to the reaction system, then the condensation water was distilled off to obtain a polyester polyol whose acid value was 3.8 and hydroxyl value was 447.8. This polyol was dissolved in cyclohexanone to give a solution whose solid content was 50%.

Preparation of Blocked Product

REFERENCE EXAMPLE 9

A two-liter capacity four-necked flask equipped with a stirring device, a thermometer, a nitrogen gas inlet tube and a reflux condenser was charged with an adduct of TMP and m-TMXDI(solid substance at room temperature, isocyanate content=13.3%)[500 parts] ethyl acetate[427.1 parts] and 1,1,3,3-tetra n-butyl-1,3 diacetoxydistannoxane[0.19 part]. To the mixture was added dropwise gradually methyl ethyl ketoxime[140.5 parts] under a blanket of nitrogen gas while maintaining the inner temperature at a range of from 60° C. to 70° C. Then, the reaction mixture was kept at the abovementioned temperature range for about four hours to thereby obtain a blocked product solution whose solid content was 60%, content of regenerated isocyanate groups was 6.20% and Gardner-Holdt viscosity(25° C.) was Q~R. The properties of this blocked product solution were shown in Table 2.

REFERENCE EXAMPLE 10

To a solution of m-TMXDI[357.1 parts] in Solvesso-100 [532.5 parts] was added dropwise methyl ethyl ketoxime [223.2 parts] over a period of one hour. The reaction mixture was then heated for further one hour at temperatures ranging from 75° C. to 80° C. To the reaction mixture were then added 1,1,3,3-tetra n-butyl-1,3 diacetoxydistannoxane[1.04 parts] and polyester polyol-[obtained by conventional condensation of adipic acid(876.6 parts), ethylene glycol(186.3 parts), TMP(201.2 parts) and dipropylene glycol(402.3 parts), acid value=3.5, hydroxyl value=172.0, solid content=100%] [217.9 parts]. The reaction was then allowed to proceed at temperatures ranging from 75° C. to 80° C. for eight hours. Thus, a blocked product solution containing 8.1% of regenerated isocyanate groups and 60% of solid portion was obtained.

EXAMPLE 11

To a solution of $H_{12}MDI$[228.6 parts] in a mixture of toluene[160.0 parts] and cyclohexanone[160.0 parts] was added dropwise methyl ethyl ketoxime[126.5 parts] over a period of one hour. The reaction mixture was heated for further one hour at temperatures ranging from 75° C. to 80° C. To the reaction mixture were then added 1,1,3,3-tetra n-butyl-1,3 diacetoxydistannoxane[0.48 part] and polyester polyol [the same one as that used Reference Example 10][123.9 parts]. The reaction was then allowed to proceed for eight hours at temperatures ranging from 75° C. to 80° C. Thus a blocked product solution [regenerated isocyanate content=7.6%, solid content=60%] was obtained.

REFERENCE EXAMPLE 12

To a solution of $H_{12}MDI$[244.1 parts] in a mixture of toluene[133.8 parts], cyclohexane[133.8 parts] and dimethylformamide[609.3 parts] was added dropwise methyl ethyl ketoxime[162.1 parts] over a period of one hour. Then, the reaction was allowed to proceed for further three hours at temperatures ranging from 75° C. to 80° C. to thereby obtain a blocked product solution [regenerated isocyanate content=6.1%, solid content=30%].

REFERENCE EXAMPLE 13

$H_{12}MDI$[262.4 parts] was dissolved in a mixture of toluene [198.2 parts] and cyclohexanone[198.2 parts]. To the solution was added dropwise methyl ethyl ketoxime[87.1 parts] in the course of about 30 minutes. The mixture was then heated at 75° C. to 80° C. for further one hour, to which were added 1,2,3,3-tetra n-butyl-1,3 diacetoxydistannoxane[0.19 part] and TMP [46.1 parts]. The reaction was then allowed to proceed at 75° C. to 80° C. for 4 hours to thereby obtain a blocked product solution containing 5.3% of regenerated isocyanate groups, whose solid content was 50%.

Preparation of white enamel and baking conditions etc.

EXAMPLE 1

To a mixture of the polyester polyol solution obtained in Reference Example 1 (27.9 parts) and the blocked product solution of Reference Example 9 (36.4 parts)(NCO/OH equivalent ratio=1.0) was added titanium oxide(Tipaque R-820; Ishihara Sangyo Kaisha Ltd.)(35.7 parts) to have the pigment weight concentration(PWC) at 50%; To the mixture was further added, as the catalyst, 1,1,3,3-tetra n-butyl-1,3-diacetoxydistannoxane(0.036 part). The whole mixture was sufficiently kneaded with a paint conditioner to give a white enamel solution. This solution was applied onto a 0.6 mm thick, surface-treated galvanized steel plate with electrolytic chromate treatment, followed by applying an epoxy resin primer to obtain a dried coating film thickness of $5\mu$ and then baked, which was coated with a bar coater to obtain a dried coating film thickness of $20\mu$. The material was then baked in the atmosphere of 260° C. for 60 seconds, thereby yielding a glossy white coating film. The formulation of the white enamel and properties of the coating film are shown in Table 3.

EXAMPLES 2 to 13

Using blocked products obtained in Reference Examples 9 to 13, compositions, in which the total volume of white enamel solution of PWC=50% was 100 parts as shown in Table 3, were subjected to baking under conditions similar to those in Example 1.

TABLE 1

| Polyester Polyol | Reference Example | | | | | | | |
|---|---|---|---|---|---|---|---|---|
| | 1 | 2 | 3 | 4 | 5 | 6 | 7 | 8 |
| Amount of Starting Materials Charged (Parts) | | | | | | | | |
| Adipic acid | 541.6 | | | | | | | |
| Succinic acid | | 552.6 | 535.0 | 503.0 | 566.8 | 619.9 | 664.7 | 550.0 |
| 3-Methyl 1,5-pentadiol | 245.3 | | | | | | | |
| Ethylene glycol | | 152.5 | | | | 228.0 | 183.4 | 151.8 |
| Propylene glycol | | | 180.9 | | | | | |
| Neopentyl glycol | | | | 232.9 | | | | |
| 2,2-diethyl 1,3 propanediol | | | | | 326.8 | | | |
| Pentaerythritol | | | | | | | | 318.6 |
| Trimethylol propane | 372.9 | 470.9 | 455.9 | 428.7 | 483.0 | 352.1 | 189.4 | 157.0 |
| Ethylene glycol | | | | | | | 183.4 | |
| Properties of Polyester Polyol | | | | | | | | |
| Acid value | 1.6 | 5.5 | 5.5 | 3.6 | 3.1 | 18.2 | 1.5 | 3.8 |
| Hydroxyl value | 216.0 | 334.1 | 321.9 | 273.8 | 291.9 | 272.2 | 215.5 | 447.8 |
| Number of functional groups | 5 | 5 | 5 | 5 | 5 | 5 | 3 | 7 |
| Number-average molecular weight | 1289 | 826 | 857 | 1011 | 951 | 966 | 776 | 870 |
| Properties of Resin Solution | | | | | | | | |
| Diluent | Cyclohexanone | Cyclohexanone | Cyclohexanone | Cyclohexanone | Cyclohexanone | Cyclohexanone | Cyclohexanone | Cyclohexanone |
| Non-volatile content (%) | 50 | 50 | 50 | 50 | 50 | 50 | 60 | 50 |
| Acid value | 0.8 | 2.8 | 2.8 | 1.8 | 1.6 | 9.1 | 0.9 | 1.9 |
| Hydroxyl value | 108.0 | 167.1 | 161.0 | 136.9 | 146.0 | 136.1 | 129.3 | 223.9 |
| Gardner-Holdt viscosity (25° C.) | J~K | H~I | G~H | G~H | G~H | D~E | H~I | V~W |

TABLE 2

| | Reference Example | | | | |
|---|---|---|---|---|---|
| | 9 | 10 | 11 | 12 | 13 |
| Properties of resin solution | | | | | |
| Non-volatile content (%) | 60 | 60 | 60 | 30 | 50 |
| Gardner-Holdt viscosity (25° C.) | Q~R | D~E | F~G | A-4~A-5 | $Z_2$~$Z_3$ |
| Regenerated isocyanate (%) | 6.20 | 8.1 | 7.6 | 6.1 | 5.3 |

TABLE 3

| | Working Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Formulation of White Enamel | | | | | | | | | | | | | |
| Polyester polyol (Reference Example) | 1 | 2 | 1 | 3 | 4 | 5 | 7 | 2 | 6 | 7 | 2 | 1 | 8 |
| Amount of polyester polyol (Reference Example) (parts) | 27.9 | 25.2 | 32.3 | 25.7 | 28.4 | 27.3 | 27.5 | 24.2 | 27.4 | 27.3 | 24.0 | 26.4 | 19.9 |
| Blocked product (Reference Example) | 9 | 10 | 10 | 10 | 10 | 10 | 11 | 11 | 11 | 12 | 12 | 13 | 11 |
| Amount of blocked product (Reference Example) (parts) | 36.4 | 38.9 | 32.2 | 38.3 | 35.9 | 36.9 | 35.0 | 39.8 | 36.8 | 43.2 | 49.2 | 40.3 | 43.8 |
| Amount of titanium oxide used (parts) | 35.7 | 35.9 | 35.5 | 35.9 | 35.7 | 35.8 | 37.5 | 36.0 | 35.8 | 29.4 | 26.8 | 33.3 | 36.2 |
| Amount of 1,1,3,3 tetra n-butyl 1,3 diacetoxy-distannoxane added (parts) | 0.036 | 0.039 | 0.032 | 0.038 | 0.036 | 0.037 | 0.035 | 0.040 | 0.037 | 0.043 | 0.049 | 0.040 | 0.044 |
| Film Performance | | | | | | | | | | | | | |
| Pencil hardness*1 | | | | | | | | | | | | | |
| Marking method | 3H | 3H | H | 3H | 3H | 3H | H | 3H | 3H | H | 2H | 3H | 3H |
| JIS method | 4H | 4H | 3H | 4H | 5H | 5H | 3H | 4H | 4H | 3H | 4H | 5H | 5H |
| T-bending*2 (20° C.) | 6T | 4T | 0T | 5T | 6T | 6T | 0T | 5T | 2T | 0T | 4T | 6T | 6T |
| Stain resistance*3 | | | | | | | | | | | | | |
| Felt pen: | | | | | | | | | | | | | |
| Black | ⊚ | ⊚ | ○ | ⊚ | ⊚ | ⊚ | ○ | ⊚ | ⊚ | ⊚ | ⊚ | ⊚ | ⊚ |
| Red | ⊚ | ○ | ○ | ⊚ | ⊚ | ○ | ○ | ⊚ | ⊚ | ○ | ⊚ | ⊚ | ⊚ |
| Solvent tolerance*4 xylene rubbing (50 times) | Passed | Passed | Passed | Passed | Passed | Passed | Passed | Passed | Passed | Passed | Passed | Passed | Passed |

Evaluation Method:
*1Pencil hardness
Marking method: In accordance with the method of JIS-K-5400, a pencil is moved horizontally on the surface of the film. The surface is wiped with a wad of sanitary cotton. The result is expressed in the hardness of the pencil which left no marking on the film surface.
JIS method: Based on JIS-K-5400
*2T-bending: With one or more iron sheets of the same thickness as the test piece sandwiched, each test piece is bent through 180° under a pressure of 50 KgG/cm² applied with hand-press at the bend is macroscopically examined through a magnifying glass of 30 times. The T-bending is shown in terms of the minimum number of the iron sheets causing no cracks in the testpiece.
*3Stain resistance: With a felt pen is drawn lines on the surface of the test film, which is left standing for 24 hours. The lines are wiped with a wad of sanitary cotton saturated with ethanol. The trace of the lines is examined for evaluation.
⊚: no trace
○: slightly traced
△: traced to some extent
×: apparent trace
*4Solvent tolerance: A textile swab impregnated with xylene is reciprocated in contact with coated surface of the testpiece with a constant force. The evaluation is made whether 50 reciprocations cause tears on the surface or not.

What is claimed is:

1. A one-can thermosetting resin composition comprising
    (1) a polyester polyol obtained by allowing an aliphatic dicarboxylic acid to react with an aliphatic glycol and a polyol having at least three functional groups and (2) a blocked product of α,α,α'α'-tetra methyl-xylylene diisocyanate or 4, 4'-methylene bis(cyclohexyl isocyanate) or a blocked product of an NCO-terminated prepolymer obtained by allowing α,α,α'α'-tetramethyl-xylylene diisocyanate and/or 4,4'-methylene bis(cyclohexylisocyanate) to react with an active hydrogen compound.

2. A resin composition as claimed in claim 1, wherein the polyester polyol has 3 to 7 functional groups, whose number-average molecular weight of 600 to 3500 and hydroxyl value of 40 to 460.

3. A resin composition as claimed in claim 1, wherein the ratio of the component (1) and the component (2) is 2/1 to ½ in terms of equivalent ratio of OH/regenerated isocyanate groups.

4. A resin composition as claimed in claim 1, wherein the polyester polyol (1) is one prepared by the reaction of succinic acid with propylene glycol and trimethylol propane and the blocked product (2) is one prepared by the reaction of α,α,α'α'-tetramethyl-xylylene diisocyanate, a polyester polyol prepared by condensation of adipic acid, ethylene glycol, trimethylol propane and dipropylene glycol and methyl ethyl ketoxime.

5. A resin composition as claimed in claim 1, wherein the polyester polyol (1) is one prepared by the reaction of succinic acid with ethylene glycol and trimethylol propane and the blocked product (2) is one prepared by the reaction of 4,4'-methylene bis(cyclohexyl isocyanate), a polyester polyol prepared by condensation of adipic acid, ethylene glycol trimethylol propane and dipropylene glycol and methyl ethyl ketoxime.

6. A resin composition as claimed in claim 1, wherein the polyester polyol (1) is one prepared by the reaction of succinic acid with ethylene glycol and trimethylol propane and the blocked product (2) is one prepared by the reaction of 4,4'-methylene bis (cyclohexyl isocyanate) with methyl ethyl ketoxime.

7. Precoated metal, which is prepared by coating a metal plate with a one-can thermosetting resin composition comprising (1) a polyester polyl obtained by allowing an aliphatic dicarboxylic acid to react with an aliphatic glycol and a polyol having at least three functional groups and (2) a blocked product of $\alpha,\alpha,\alpha'\alpha'$-tetramethylxylylene diisocyanate or 4,4'-methylene bis (cyclohexyl isocyanate), or a blocked product of an NCO-terminated prepolymer obtained by allowing $\alpha,\alpha,\alpha'\alpha'$-tetramethylxylylene diisocyanate and/or 4,4'-methylene bis (cyclohexylisocyanate) to react with an active hydrogen compound, and heating thus coated metal plate to cause the coated material to cure.

8. Precoated metal as claimed in claim 7, wherein the polyester polyol has 3 to 7 functional groups, whose number-average molecular weight of 600 to 3500 and the hydroxyl value of 40 to 460.

9. Precoated metal as claimed in claim 7, wherein the ratio of the component (1) and the component (2) is 2/1 to ½ in terms of equivalent ratio of OH/regenerated isocyanate groups.

10. Precoated metal as claimed in claim 7, wherein the heat metal temperature is 150° to 350° C. and the heating time is in the range of from 20 to 120 seconds.

* * * * *